(12) United States Patent
Cao

(10) Patent No.: US 12,259,637 B2
(45) Date of Patent: Mar. 25, 2025

(54) METHOD AND APPARATUS FOR CONTROLLING CAMERA, AND UNDER-DISPLAY CAMERA STRUCTURE

(71) Applicant: ZTE Corporation, Shenzhen (CN)

(72) Inventor: Li Cao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 188 days.

(21) Appl. No.: 18/010,012

(22) PCT Filed: May 18, 2021

(86) PCT No.: PCT/CN2021/094304
§ 371 (c)(1),
(2) Date: Dec. 13, 2022

(87) PCT Pub. No.: WO2021/254069
PCT Pub. Date: Dec. 23, 2021

(65) Prior Publication Data
US 2023/0251552 A1    Aug. 10, 2023

(30) Foreign Application Priority Data
Jun. 16, 2020 (CN) .......................... 202010549854.0

(51) Int. Cl.
*H04N 23/74* (2023.01)
*G03B 15/03* (2021.01)
(Continued)

(52) U.S. Cl.
CPC .......... *G03B 15/03* (2013.01); *H04M 1/0264* (2013.01); *H04N 23/56* (2023.01); *H04N 23/57* (2023.01);
(Continued)

(58) Field of Classification Search
CPC .. G03B 15/03; H04M 1/0264; H04M 1/0266; H04M 1/22; H04N 23/56; H04N 23/57; H04N 23/74; H05B 45/10; H05B 47/155
(Continued)

(56) References Cited

U.S. PATENT DOCUMENTS 6,072,551 A * 6/2000 Jannson ............... G02B 6/0053
349/64
9,958,601 B2 * 5/2018 Menon ................. G02B 6/0096
(Continued)

FOREIGN PATENT DOCUMENTS

CN    110491290 A    11/2019
CN    110658582 A    1/2020
(Continued)

OTHER PUBLICATIONS

International Search Report for corresponding application PCT/CN2021/094304 filed May 18, 2021; Mail date Aug. 9, 2021.

*Primary Examiner* — Ryan Jager
(74) *Attorney, Agent, or Firm* — CANTOR COLBURN LLP

(57) ABSTRACT

Provided are a method and an apparatus for controlling an under-display camera, and the under-display camera structure. The method includes: when a camera is in a turned-on state, lamp beads close to a camera end are turned off and lamp beads far away from the camera are controlled to be in a lighting state, and light emitted by the second-type lamp beads forms a circle of light on the convex glass after being refracted by the convex glass; and when the camera is in a turned-off state, the plurality of lamp beads are controlled to be in a lighting state, and backlight for the convex glass after being refracted is provided by the convex glass. When the camera is turned on, the light emitted by the lamp beads far away from the camera forms a circle of light on the convex glass after being refracted by the convex glass.

20 Claims, 4 Drawing Sheets

(51) Int. Cl.
 *H04M 1/02* (2006.01)
 *H04N 23/56* (2023.01)
 *H04N 23/57* (2023.01)
 *H05B 45/10* (2020.01)
 *H05B 47/155* (2020.01)

(52) U.S. Cl.
 CPC ............ *H04N 23/74* (2023.01); *H05B 45/10* (2020.01); *H05B 47/155* (2020.01)

(58) Field of Classification Search
 USPC .......................................................... 315/297
 See application file for complete search history.

(56) References Cited

U.S. PATENT DOCUMENTS

| | | | | |
|---|---|---|---|---|
| 2007/0081361 | A1* | 4/2007 | Clary | G02B 6/0055 |
| | | | | 362/624 |
| 2011/0310330 | A1* | 12/2011 | Uchida | G02B 19/0066 |
| | | | | 349/67 |
| 2023/0251552 | A1* | 8/2023 | Cao | H05B 47/155 |
| | | | | 315/297 |
| 2024/0036362 | A1* | 2/2024 | Zhang | G02F 1/0136 |
| 2024/0177647 | A1* | 5/2024 | He | G09G 3/32 |

FOREIGN PATENT DOCUMENTS

| | | |
|---|---|---|
| CN | 111050045 A | 4/2020 |
| CN | 111107193 A | 5/2020 |

\* cited by examiner

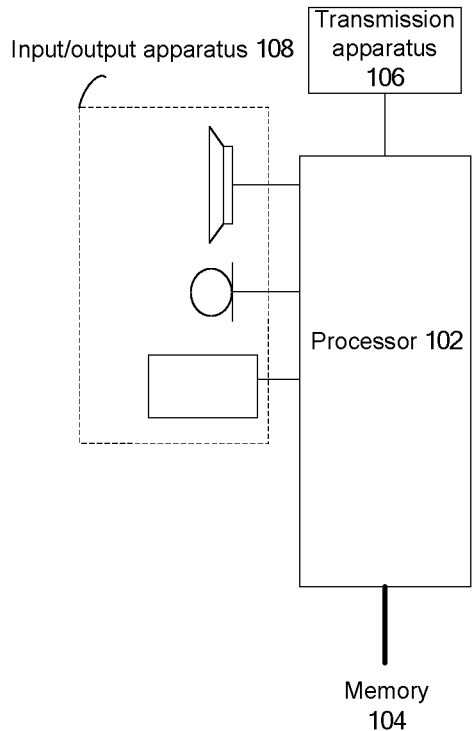

Fig. 1

When a camera is detected to be in a turned-on state, first-type lamp beads which are pre-determined in the plurality of lamp beads and are close to the camera end are turned off, predetermined second-type lamp beads far away from the camera are controlled to be in a lighting state, and light emitted by the second-type lamp beads forms a circle of light on the convex glass after being refracted by the convex glass, so as to make the convex glass display no images — S202

When the camera is detected to be in a turned-off state, the plurality of lamp beads are controlled to be in a lighting state, and backlight is provided for the convex glass after refraction by the convex glass, so as to make the convex glass display images — S204

Fig. 2

METHOD AND APPARATUS FOR CONTROLLING CAMERA, AND UNDER-DISPLAY CAMERA STRUCTURE

CROSS-REFERENCE TO RELATED APPLICATION

This disclosure is based upon and claims priority to Chinese Patent Application No. 202010549854.0, filed on Jun. 16, 2020, and entitled "Method and Apparatus for Controlling Camera, and Under-display Camera Structure", the entire contents of which are incorporated herein by reference.

TECHNICAL FIELD

Embodiments of the present disclosure relate to the field of intelligent terminals, and particularly relate to a method and an apparatus for controlling a camera, and an under-display camera structure.

BACKGROUND

Full-display literally means a display covering the entire front surface of a mobile phone, without bezels at four sides of the mobile phone and with a screen-to-body ratio close to 100%. However, limited by the prior art, only mobile phones having an ultra-high display-to-body ratio are commercially available for the time being, while ones having a display-to-body ratio of 100% are still unavailable. Nowadays, a full-display mobile phone actually is a mobile phone having a display-to-body ratio of 90% or above and designed with ultra-narrow bezels.

All full-display mobile phone manufacturers have to face and solve the common problem: since a receiver, a front camera and various sensors have to be placed on a front surface of a mobile phone so as to satisfy daily demands of users, these devices will inevitably occupy part of a display area when being placed on the front surface of the mobile phone. As a consequence, all mobile phone manufacturers are seeking to reduce an area occupied by these functional devices, and various full-display solutions such as "Bang-like display", "water drop-like display" and "hole-like display" have successively emerged one after another.

In the related technology, provided is an under-display camera. The under-display camera includes: a display panel, a backlight module, a light guide component and a light source component. The backlight module is arranged at one side of the display panel, and is provided with a first opening corresponding to the under-display camera. The light guide component is inserted into the first opening, and is configured to guide a light beam entering the light guide component to a display panel area corresponding to the first opening. The light source component is configured to provide a light source for the light guide component. When the under-display camera is turned on, the light source component is turned off. When the under-display camera is not turned on, the light source component is turned on or off. Therefore, a through hole or blind hole on the display panel can repossess display capability, and image quality that can be obtained by the under-display camera can still be maintained.

As a light source is provided by a side light guide component, a direction of light cannot be adjusted and concentrated, and most of the light cannot be upward incident on a glass area, thereby affecting backlight efficiency. Meanwhile, light cannot be supplemented when a front camera is used.

There is a problem of a poor photographing effect when ambient light is weak due to limited light entering an under-display camera in the related technology.

SUMMARY

Embodiments of the present disclosure provide a method and an apparatus for controlling a camera, and an under-display camera structure, so as to at least solve a problem of a poor photographing effect when ambient light is weak due to limited light entering an under-display camera in the related technology.

An embodiment of the present disclosure provides an under-display camera structure. The under-display camera structure includes: a display and a camera arranged under the display. The display includes display glass and display area backlight. An opening area is configured in the display area backlight above the camera. The display glass forms convex glass in a direction of the opening area curving towards the camera. A flexible printed circuit board having an annular conical structure is connected between the convex glass and the camera, so as to surround a viewing angle of the camera. A plurality of lamp beads are sequentially arranged on the flexible printed circuit board from a camera end to a convex glass end.

When the camera is in a turned-on state, first-type lamp beads which are pre-determined in the plurality of lamp beads and are close to the camera end are in a turned off state, predetermined second-type lamp beads far away from the camera are controlled to be in a lighting state, and light emitted by the second-type lamp beads forms a circle of light on the convex glass after being refracted by the convex glass, so as to make the convex glass display no images.

When the camera is in a turned-off state, the plurality of lamp beads are in a lighting state, and backlight is provided for the convex glass after refraction by the convex glass, so as to make the convex glass display images.

In an exemplary embodiment, the second-type lamp beads are at a maximum brightness value.

In an exemplary embodiment, an inclination angle of the annular conical structure is determined according to a light incident angle of the camera, pixels of the camera, a brightness of the display, a thickness of the display area backlight and a size of the opening area.

In another exemplary embodiment, the flexible printed circuit board is configured to conduct the plurality of lamp beads and is connected to a backlight chip, wherein the backlight chip is configured to control brightness of the plurality of lamp beads.

Another embodiment of the present disclosure provides a method for controlling an under-display camera. The method includes:

when a camera is detected to be in a turned-on state, predetermined first-type lamp beads close to a camera end are turned off and predetermined second-type lamp beads away from the camera are controlled to be in a lighting state, and light emitted by the second-type lamp beads forms a circle of light on the convex glass after being refracted by the convex glass, so as to make the convex glass display no images, wherein a display is arranged above the camera, the display includes display glass and display area backlight, an opening area is configured in the display area backlight above the camera, the display glass forms convex glass in a direction of the opening area curving towards the camera, a flexible printed circuit board having an annular conical structure is connected between the convex glass and the camera, so as to surround a viewing angle of the camera, and a plurality of lamp beads are sequentially arranged on the flexible printed circuit board from the camera end to a convex glass end; and when the camera is detected to be in a turned-off state, the plurality of lamp beads are controlled to be in a lighting state, and backlight is provided for the convex glass after being refracted by the convex glass, so as to make the convex glass display images.

In an exemplary embodiment, before the predetermined first-type lamp beads close to a camera end are turned off and the predetermined second-type lamp beads away from the camera are controlled to be in a lighting state, the method further includes:

an inclination angle of the annular conical structure is determined;

a light angle of light emitted by the lamp beads after reflection by the convex glass is determined according to the inclination angle of the annular conical structure, a radian of the convex glass and a light-emitting angle of the lamp beads; and the first-type lamp beads and the second-type lamp beads are determined according to the light angle, the light-emitting angle of the lamp beads and a light incident angle of the camera.

In an exemplary embodiment, the inclination angle of the annular conical structure is determined includes:

the light incident angle of the camera, pixels of the camera, a brightness of the display, a thickness of the display area backlight and a size of the opening area are obtained; and the inclination angle of the annular conical structure is determined according to the light incident angle of the camera, the pixels of the camera, the brightness of the display, the thickness of the display area backlight and the size of the opening area.

In an exemplary embodiment, after the inclination angle of the annular conical structure is determined, the method further includes:

the number of the plurality of lamp beads and an arrangement mode of the plurality of lamp beads are determined according to the brightness of the display, the inclination angle of the annular conical structure and the size of the opening area.

In an exemplary embodiment, after the predetermined second-type lamp beads away from the camera is controlled to be in a lighting state, the method further includes:

the second-type lamp beads are adjusted to a maximum brightness value.

In another exemplary embodiment, brightness of the plurality of lamp beads are controlled includes:

the brightness of the plurality of lamp beads are controlled by a backlight chip, wherein the flexible printed circuit board is configured to conduct the plurality of lamp beads and is connected to the backlight chip.

Another embodiment of the present disclosure provides an apparatus for controlling an under-display camera. The device includes:

a first control module, configured to turn off predetermined first-type lamp beads close to a camera end and control predetermined second-type lamp beads away from the camera to be in a lighting state when a camera is detected to be in a turned-on state, and light emitted by the second-type lamp beads forms a circle of light on the convex glass after being refracted by the convex glass, so as to make the convex glass display no images, wherein a display is arranged above the camera, the display includes display glass and display area backlight, an opening area is configured in the display area backlight above the camera, the display glass forms convex glass in a direction of the opening area curving towards the camera, a flexible printed circuit board having an annular conical structure is connected between the convex glass and the camera, so as to surround a viewing angle of the camera, and a plurality of lamp beads are sequentially arranged on the flexible printed circuit board from the camera end to a convex glass end; and a second control module, configured to control the plurality of lamp beads to be in a lighting state when the camera is detected to be in a turned-off state, backlight being provided for the convex glass after being refracted by the convex glass, so as to make the convex glass display images.

In an exemplary embodiment, the device further includes:

a first determination module, configured to determine an inclination angle of the annular conical structure;

a second determination module, configured to determine a light angle of light emitted by the lamp beads after being reflected by the convex glass according to the inclination angle of the annular conical structure, a radian of the convex glass and a light-emitting angle of the lamp beads; and a third determination module, configured to determine the first-type lamp beads and the second-type lamp beads according to the light angle, the light-emitting angle of the lamp beads and a light incident angle of the camera.

In an exemplary embodiment, the first determination module includes:

an obtaining sub-module, configured to obtain the light incident angle of the camera, pixels of the camera, a brightness of the display, a thickness of the display area backlight and a size of the opening area; and a determination sub-module, configured to determine the inclination angle of the annular conical structure according to the light incident angle of the camera, the pixels of the camera, the brightness of the display, the thickness of the display area backlight and the size of the opening area.

In an exemplary embodiment, after determining an inclination angle of the annular conical structure, the device further includes:

a fourth determination module, configured to determine the number of the plurality of lamp beads and an arrangement mode of the plurality of lamp beads according to the brightness of the display, the inclination angle of the annular conical structure and the size of the opening area.

In an exemplary embodiment, the device further includes:

an adjustment module, configured to adjust the second-type lamp beads to a maximum brightness value.

In another exemplary embodiment, the second control module is further configured to control brightness of the plurality of lamp beads by a backlight chip, wherein the flexible printed circuit board is configured to conduct the plurality of lamp beads and is connected to the backlight chip.

Another embodiment of the present disclosure further provides a computer-readable storage medium that stores a computer program. The computer program is configured to execute steps of any one of the above-described method embodiments at runtime.

Another embodiment of the present disclosure further provides an electronic device. The electronic device includes a memory and a processor. The memory stores a computer program. The processor is configured to run the computer program so as to execute steps of any one of the above-described method embodiments.

According to the present disclosure, the convex glass is arranged below the display glass, a plurality of lamp beads are arranged below the convex glass, and the camera is arranged below the display glass. When the camera is turned off, the convex glass is normal display glass. When the camera is turned on, some the lamp beads are turned off, no images are displayed by the convex glass, and the light emitted by the lamp beads far away from the camera forms a circle of light on the convex glass after being refracted by the convex glass, so as to supplement light of the camera, thereby solving a problem of a poor photographing effect when ambient light is weak due to limited light entering an under-display camera in the related technology, and improving a photographing effect when the ambient light is weak.

BRIEF DESCRIPTION OF THE DRAWINGS

FIG. 1 is a structural block diagram of hardware of a mobile terminal of a method for controlling a camera of an embodiment of the present disclosure;

FIG. 2 is a flowchart of a method for controlling an under-display camera according to an embodiment of the present disclosure;

DETAILED DESCRIPTION OF THE EMBODIMENTS

Figure 3:
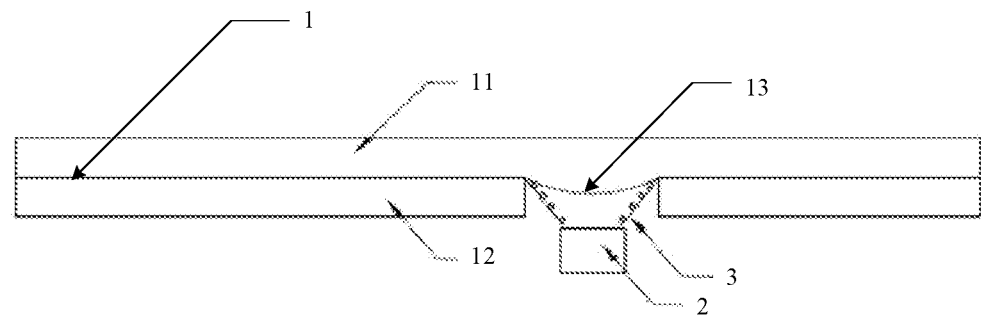
FIG. 3 is a schematic diagram of an under-display camera structure according to an embodiment of the disclosure.

Embodiments of the present disclosure will be described in detail below with reference to the accompanying drawings in conjunction with the embodiments.

It should be noted that "first", "second", etc. in the description, claims and above-mentioned accompanying drawings of the present disclosure are used for distinguishing similar subjects instead of describing a specific order or precedence order.

The method embodiments provided by the embodiments of the disclosure may be executed in a mobile terminal, a computer terminal or a similar computing device. With running on a mobile terminal as an example, FIG. 1 is a structural block diagram of hardware of a mobile terminal of a method for controlling an under-display camera of an embodiment of the present disclosure. As shown in FIG. 1, the mobile terminal may include one or more (only one is shown in FIG. 1) processors 102 (the processors 102 may include, but may be not limited to, processing devices such as a microprocessor control unit (MCU) or a field programmable gate array (FPGA)) and a memory 104 for storing data. The mobile terminal may further include a transmission apparatus 106 having a communication function and an input/output apparatus 108. Those of ordinary skill in the art may understand that a structure shown in FIG. 1 is merely schematic and does not limit a structure of the mobile terminal. For example, the mobile terminal may further include more or fewer assemblies than those shown in FIG. 1, or have a different configuration from that shown in FIG. 1.

The memory 104 may be configured to store a computer program such as a software program and module of application software, for example, a computer program corresponding to a method for controlling an under-display camera in an embodiment of the present disclosure. The processor 102 executes various functional applications and data processing by running the computer program stored in the memory 104, thereby implementing the method. The memory 104 may include a high-speed random access memory, and may further include a non-volatile memory, for example, one or more magnetic storage devices, flash memories, or other non-volatile solid-state memories. In some examples, the memory 104 may further include a memory remotely arranged with respect to the processor 102, and the remote memory may be connected to the mobile terminal by means of a network. Examples of networks include, but are not limited to, the Internet, enterprise intranets, local area networks, mobile communication networks, and combinations thereof.

A transmission device 106 is configured to receive or transmit data by means of one network. Specific examples of the network may include a wireless network provided by a communication provider of the mobile terminal. In an example, the transmission device 106 includes a network interface controller (NIC) that may be connected with other network apparatuses by means of a base station so as to communicate with the Internet. In an example, the transmission device 106 may be a radio frequency (RF) module that is configured to communicate wirelessly with the Internet.

The embodiment provides a method for controlling an under-display camera, which runs on the mobile terminal or network structure. FIG. 2 is a flowchart of a method for controlling an under-display camera according to an embodiment of the present disclosure. As shown in FIG. 2, a flow includes the following steps:

S202, when a camera is detected to be in a turned-on state, first-type lamp beads which are pre-determined in the plurality of lamp beads and are close to the camera end are turned off, predetermined second-type lamp beads far away from the camera are controlled to be in a lighting state, and light emitted by the second-type lamp beads forms a circle of light on the convex glass after being refracted by the convex glass, so as to make the convex glass display no images. Wherein a display is arranged above the camera. The display includes display glass and display area backlight. An opening area is configured in the display area backlight above the camera. The display glass forms convex glass in a direction of the opening area curving towards the camera. A flexible printed circuit board having an annular conical structure is connected between the convex glass and the camera, so as to surround a viewing angle of the camera. A plurality of lamp beads are sequentially arranged on the flexible printed circuit board from the camera end to a convex glass end.

In an exemplary embodiment, S202 may specifically include the following step that predetermined first-type lamp beads close to the camera end are turned off according to a preset rule, and predetermined second-type lamp beads far away from the camera are controlled to be in a lighting state.

S204, when the camera is detected to be in a turned-off state, the plurality of lamp beads are controlled to be in a lighting state, and backlight is provided for the convex glass after refraction by the convex glass, so as to make the convex glass display images.

In an exemplary embodiment, S204 may specifically include the following step that brightness of the plurality of lamp beads is controlled by a backlight chip, wherein the flexible printed circuit board is configured to conduct the plurality of lamp beads and is connected to the backlight chip.

Through S202-S208, the convex glass is arranged below the display glass, and a plurality of lamp beads are arranged below the convex glass, such that the camera is arranged below the display glass. When the camera is turned off, the convex glass is normal display glass. When the camera is turned on, some of the lamp beads are turned off, no images are displayed by the convex glass, and the light emitted by the lamp beads far away from the camera forms a circle of light on the convex glass after being refracted by the convex glass, so as to supplement light of the camera, thereby solving a problem of a poor photographing effect when ambient light is weak due to limited light entering an under-display camera in the related technology, and improving a photographing effect when the ambient light is weak.

In an exemplary embodiment, after predetermined second-type lamp beads far away from the camera are controlled to be in a lighting state, the second-type lamp beads are adjusted to a maximum brightness value.

In an exemplary embodiment, before predetermined first-type lamp beads close to the camera end are turned off, and predetermined second-type lamp beads far away from the camera are controlled to be in a lighting state, an inclination angle of the annular conical structure is determined. Furthermore, a light incident angle of the camera, pixels of the camera, a brightness of the display, a thickness of the display area backlight and a size of the opening area are obtained. The inclination angle of the annular conical structure is determined according to the light incident angle of the camera, the pixels of the camera, the brightness of the display, the thickness of the display area backlight and the size of the opening area.

A light angle of light emitted by the lamp beads after reflection by the convex glass is determined according to the inclination angle of the annular conical structure, a radian of the convex glass and a light-emitting angle of the lamp beads. The first-type lamp beads and the second-type lamp beads are determined according to the light angle, the light-emitting angle of the lamp beads and the light incident angle of the camera.

In another exemplary embodiment, after the inclination angle of the annular conical structure is determined, the number of the plurality of lamp beads and an arrangement mode of the plurality of lamp beads are determined according to the brightness of the display, the inclination angle of the annular conical structure and the size of the opening area.

From the description of the above implementations, it may be apparent to those skilled in the art that the methods according to the above-described embodiments may be implemented by means of software plus a necessary general-purpose hardware platform, and certainly may also be implemented by means of hardware, but in many cases the former is a better implementation. With such understanding, the technical solution of the present disclosure, in essence or from the view of part contributing to the prior art, may be embodied in the form of a software product. The computer software product is stored in a storage medium (such as a read only memory (ROM)/a random access memory (RAM), a magnetic disk and an optical disk) and includes several instructions configured to make a terminal apparatus (which may be a mobile phone, a computer, a server, a network apparatus, etc.) conduct the method in each of the embodiments of the present disclosure.

The embodiment further provides an under-display camera structure. FIG. 3 is a schematic diagram of an under-display camera structure according to an embodiment of the disclosure. As shown in FIG. 3, the structure includes: a display 1 and a camera 2 arranged under the display. The display 1 includes display glass 11 and display area backlight 12. An opening area is configured in the display area backlight above the camera 2. The display glass 11 forms convex glass 13 in a direction of the opening area curving towards the camera 2. A flexible printed circuit board 3 having an annular conical structure is connected between the convex glass 13 and the camera 22, so as to surround a viewing angle of the camera 2. A plurality of lamp beads are sequentially arranged on the flexible printed circuit board 3 from the camera 2 end to a convex glass end.

When the camera 2 is in a turned-on state, lamp beads close to the camera 2 end among the plurality of lamp beads are in a turned-off state, lamp beads far away from the camera 2 are in a lighting state, and light emitted by the lamp beads away from the camera 2 forms a circle of light on the convex glass 13 after being refracted by the convex glass 13, so as to make the convex glass 13 display no images.

When the camera 2 is in a turned-off state, the plurality of lamp beads are in a lighting state, and backlight is provided for the convex glass 13 after refraction by the convex glass 13, so as to make the convex glass 13 display images.

In an exemplary embodiment, the lamp beads away from the camera 2 are at a maximum brightness value.

In an exemplary embodiment, an angle of the annular conical structure of the flexible printed circuit board 3 is determined according to the viewing angle of the camera 2, pixels of the camera 2, a brightness of the display, a thickness of the display area backlight and a size of the opening area.

In another exemplary embodiment, the flexible printed circuit board 3 is configured to conduct the plurality of lamp beads and is connected to a backlight chip, wherein the backlight chip is configured to control brightness of the plurality of lamp beads.

In the embodiment, the display glass 11 is divided into plain glass 12 in a normal display area and the convex glass 13 in a front camera area. A light incident angle of a front camera 2 is a viewing angle 301. Normal display area backlight 12 may use an existing backlight structure solution, which will not be described in detail. Front camera area backlight 4 is divided into a plurality of small light-emitting diode (LED) lamp beads and the flexible printed circuit board 3. The flexible printed circuit board 3 conducts the LED lamp beads and may independently control brightness of each bead by means of the backlight chip. The whole front camera area backlight 4 has an annular conical structure, and is provided with a central opening so as to avoid a viewing angle of the front camera 2.

Figure 4:
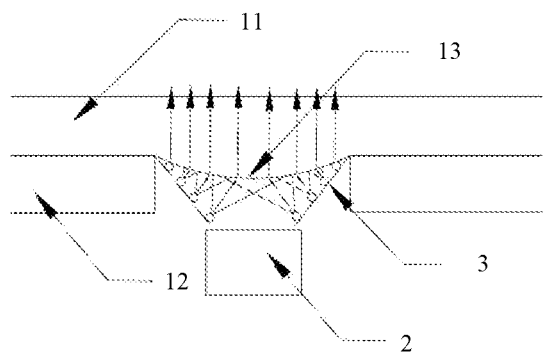
FIG. 4 is a first schematic diagram of an under-display camera structure according to a preferred embodiment of the disclosure.

FIG. 4 is a first schematic diagram of an under-display camera structure according to a preferred embodiment of the disclosure. As shown in FIG. 4, when the front camera is not used and full-screen display is required, the LED lamp beads emit light so as to provide backlight for the display glass in the front camera area. Each LED lamp bead has a certain illumination angle, which may completely cover the whole display glass in the front camera area, and brightness of each LED lamp bead is adjusted by the backlight chip. In this way, the backlight of the whole display glass in the front camera area may be uniform without adding additional light diffusion or guiding materials. The light emitted by the LED lamp beads may be concentrated and emitted upward out of a screen under a converging action of the convex glass 13 in the front camera area, so as to realize a better display effect.

Figure 5:
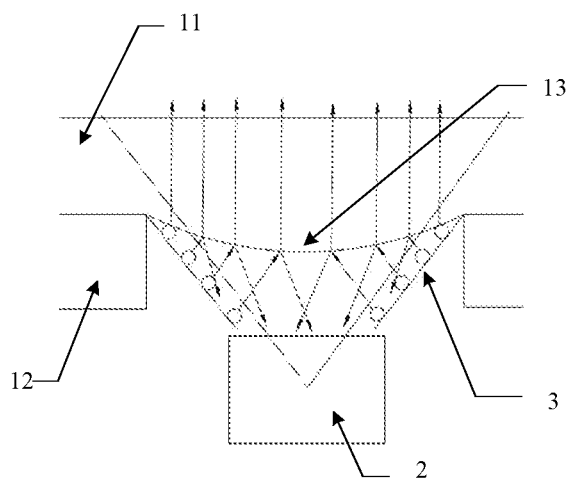
FIG. 5 is a second schematic diagram of an under-display camera structure according to a preferred embodiment of the disclosure.

FIG. 5 is a second schematic diagram of an under-display camera structure according to a preferred embodiment of the disclosure. As shown in FIG. 5, when the front camera is to be used, if all the LED lamp beads are still lighting, part of light emitted by LED lamp beads close to the front camera may be reflected by the convex glass 13 and enter the viewing angle of the front camera, thereby interfering with imaging of the front camera.

Figure 6:
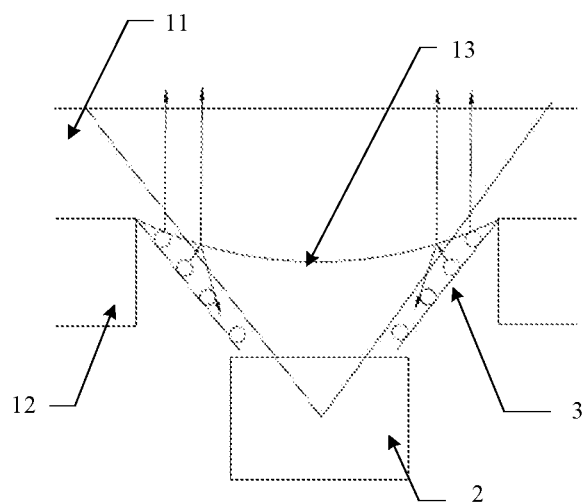
FIG. 6 is a third schematic diagram of an under-display camera structure according to a preferred embodiment of the disclosure.

FIG. 6 is a third schematic diagram of an under-display camera structure according to a preferred embodiment of the disclosure. As shown in FIG. 6, when the front camera is used, only the LED lamp beads far away from the front camera are in a lighting state, such that the light emitted by the LED lamp beads cannot be reflected to enter the viewing angle of the front camera. The turned-on LED lamp beads are adjusted to a maximum brightness. In this case, the convex glass 13 displays no image, but forms a circle of light. Most of people and scenery photographed by the front camera are people and scenery close to the front camera. Light emitted by the circle of light falls on the people and scenery close to the front camera, and then is reflected back, so as to increase the amount of light incident on the front camera 2 and improve an imaging effect.

Figure 7:
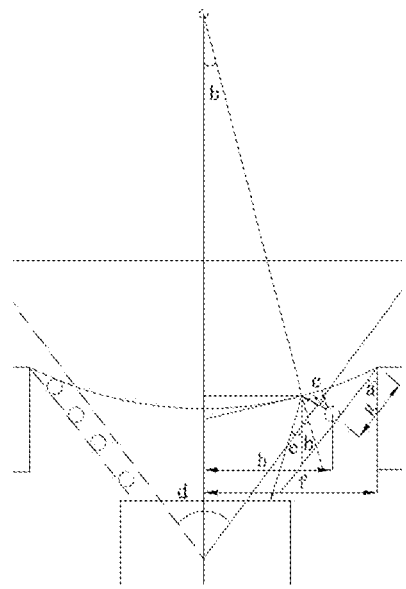
FIG. 7 is a fourth schematic diagram of an under-display camera structure according to a preferred embodiment of the disclosure.

FIG. 7 is a fourth schematic diagram of an under-display camera structure according to a preferred embodiment of the disclosure. As shown in FIG. 7, when the front camera is turned on, LED lamp beads to be in a lighting state may be determined by combining three dimensional (3D) simulated computation and black-box debugging, which is mainly related to the following factors, includes: an inclination angle a of a flexible printed circuit board, a radian b of convex glass, a light-emitting angle c of LED lamp beads, a light incident angle d of the front camera, a light angle e of light emitted by lamp beads after reflection by the convex glass, a transverse distance f from a backlight opening edge to a front camera center, a distance g from the lamp beads to a flexible printed circuit board edge, and a transverse distance h from the lamp beads to the front camera center.

When the 3D simulated computation is performed, the two most important factors are the light angle e of the light emitted by the lamp beads after being reflected by the convex glass and the transverse distance h from the lamp beads to the front camera center. The smaller the light angle e is, the less easy the light enter the front camera. The larger the transverse distance h from the lamp beads to the center of the front camera is, the less easy the light enter the front camera.

According to a relation between dimensions marked in FIG. 7, it may be computed that $e=90°-a+(c/2)-2b$, and $h=f-g*\sin(a)$. According to a computation formula, to a certain extent, the larger the angle a and angle b, the smaller the angle e; and the smaller the angle c, the smaller the angle e. To a certain extent, the larger the distance f, the larger the distance h; and the smaller the distance g and angle a, the larger the distance h. Designing of specific dimensions and angles requires comprehensive consideration, so as to avoid problems of blocking the viewing angle of the front camera by the flexible printed circuit board, and exposing the front camera edge due to too large backlight opening.

In practice, a preliminary LED lamp bead design solution is obtained through 3D simulated computation. It is necessary to conduct detailed debugging in a black box so as to finally determine LED lamp beads to be turned on when the front camera is used. The whole machine is placed in the black box, and some of lamp beads to be turned on that are obtained through 3D simulated computation are turned on. At the same time, the front camera is turned on. If a photosensitive device of the front camera may sense light, it is necessary to turn off another row of lamp beads close to the front camera until the photosensitive device of the front camera cannot sense the light reflected by the LED lamp beads.

Figure 8:
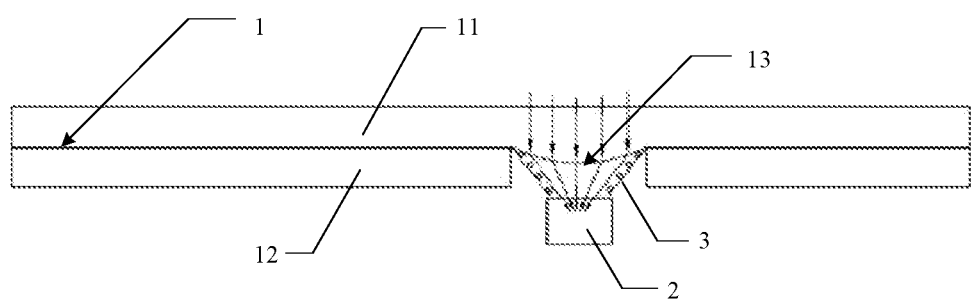
FIG. 8 is a fifth schematic diagram of an under-display camera structure according to a preferred embodiment of the disclosure.

FIG. 8 is a fifth schematic diagram of an under-display camera structure according to a preferred embodiment of the disclosure. As shown in FIG. 8, the converging action of the convex glass 13 may also make ambient light that originally cannot enter the viewing angle of the front camera converge and enter the viewing angle of the front camera, thereby increasing the amount of light enter the front camera, and being conducive to further improvement of the imaging effect.

The embodiment further provides an apparatus for controlling a camera. The device is configured to implement the above embodiments and preferred embodiments, and what has been described will not be repeated herein. The term "module", as used below, may implement a combination of software and/or hardware having predetermined functions. While the device described in the following embodiments is preferably implemented in software, implementation in hardware, or a combination of software and hardware is also possible and conceivable.

Figure 9:
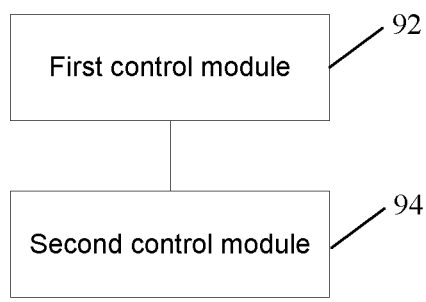
FIG. 9 is a structural block diagram of an apparatus for controlling an under-display camera according to an embodiment of the present disclosure.

FIG. 9 is a structural block diagram of an apparatus for controlling a camera according to an embodiment of the present disclosure. As shown in FIG. 9, the device includes:

a first control module 92, configured to turn off predetermined first-type lamp beads close to a camera end and control predetermined second-type lamp beads far away from the camera to be in a lighting state when a camera is detected to be in a turned-on state, and light emitted by the second-type lamp beads forms a circle of light on the convex glass after being refracted by the convex glass, so as to make the convex glass display no images, wherein a display is arranged above the camera, the display includes display glass and display area backlight, an opening area is configured in the display area backlight above the camera, the display glass forms convex glass in a direction of the opening area curving towards the camera, a flexible printed circuit board having an annular conical structure is connected between the convex glass and the camera, so as to surround a viewing angle of the camera, and a plurality of lamp beads are sequentially arranged on the flexible printed circuit board from the camera end to a convex glass end; and a second control module 94, configured to control the plurality of lamp beads to be in a lighting state when the camera is detected to be in a turned-off state, backlight being provided for the convex glass after being refracted by the convex glass, so as to make the convex glass display images.

In an exemplary embodiment, the device further includes:

a first determination module, configured to determine an inclination angle of the annular conical structure;

a second determination module, configured to determine a light angle of light emitted by the lamp beads after being reflected by the convex glass according to the inclination angle of the annular conical structure, a radian of the convex glass and a light-emitting angle of the lamp beads; and a third determination module, configured to determine the first-type lamp beads and the second-type lamp beads according to the light angle, the light-emitting angle of the lamp beads and a light incident angle of the camera.

In an exemplary embodiment, the first determination module includes:

an obtaining sub-module, configured to obtain the light incident angle of the camera, pixels of the camera, a brightness of the display, a thickness of the display area backlight and a size of the opening area; and a determination sub-module, configured to determine the inclination angle of the annular conical structure according to the light incident angle of the camera, the pixels of the camera, the brightness of the display, the thickness of the display area backlight and the size of the opening area.

In an exemplary embodiment, after an inclination angle of the annular conical structure is determined, the device further includes:

a fourth determination module, configured to determine the number of the plurality of lamp beads and an arrangement mode of the plurality of lamp beads according to the brightness of the display, the inclination angle of the annular conical structure and the size of the opening area.

In an exemplary embodiment, the device further includes:

an adjustment module configured to adjust the second-type lamp beads to a maximum brightness value.

In another exemplary embodiment, the second control module 84 is further configured to control brightness of the plurality of lamp beads by a backlight chip, wherein the flexible printed circuit board is configured to conduct the plurality of lamp beads and is connected to the backlight chip.

It should be noted that various above-described modules may be implemented by software or hardware; in the case of implementation by hardware, the modules may be implemented in such a way that the modules are located in the same processor, but are not limited to the way; or the modules are separately located in different processors in any combination form.

An embodiment of the present disclosure further provides a computer-readable storage medium that stores a computer program. The computer program is configured to run to execute steps of any one of the above-described method embodiments.

In an exemplary embodiment, the computer-readable storage medium may include, but may be not limited to, a universal serial bus (USB) flash disk, ROM, RAM, a mobile hard disk, a magnetic disk, an optical disk, and various media that may store computer programs.

An embodiment of the present disclosure further provides an electronic device that includes a memory and a processor. The memory stores a computer program, and the processor is configured to run a computer program so as to execute steps of any one of the above-described method embodiments.

In an exemplary embodiment, the electronic device may further include a transmission apparatus and an input/output apparatus. The transmission apparatus is connected to the processor, and the input/output apparatus is connected to the processor.

Specific examples in the embodiment may be referred to the examples described in the above-described embodiments and exemplary implementations, which are not described in detail herein.

Obviously, those skilled in the art should be understand that the above-described modules or steps of the present disclosure may be implemented by a general-purpose computation device, and may be centralized on a single computation device or distributed on a network composed of a plurality of computation devices. They may be implemented by program codes executable by the computation device, such that they may be stored in a storage device to be executed by the computation device. Under some conditions, the steps shown or described may be executed in an order different from that herein, or they may be fabricated separately as individual integrated circuit modules, or a plurality of modules or steps thereof may be fabricated as a single integrated circuit module to be implemented. In this way, the present disclosure is not limited to any particular combination of hardware and software.

The above has been described only as preferred embodiments of the present disclosure and is not intended to limit the present disclosure, which may be modified and changed, for those skilled in the art. Any modifications, equivalent replacements, improvements, etc. made within the principles of the present disclosure should fall within the scope of protection of the present disclosure.

INDUSTRIAL APPLICABILITY

The embodiments are used in the field of intelligent terminals, and may solve a problem of a poor photographing effect when ambient light is weak due to limited light entering an under-display camera in the related technology, and improve a photographing effect when the ambient light is weak.

What is claimed is:

1. An under-display camera structure, comprising: a display and a camera arranged under the display, wherein the display comprises display glass and display area backlight, an opening area is configured in the display area backlight above the camera, the display glass forms convex glass in a direction of the opening area curving towards the camera, a flexible printed circuit board having an annular conical structure is connected between the convex glass and the camera, so as to surround a viewing angle of the camera, and a plurality of lamp beads are sequentially arranged on the flexible printed circuit board from a camera end to a convex glass end, wherein when the camera is in a turned-on state, a first-type lamp bead which is pre-determined in the plurality of lamp beads and is close to the camera end is in a turned off state, a predetermined second-type lamp beads far away from the camera are in a lighting state, and light emitted by the second-type lamp beads forms a circle of light on the convex glass after being refracted by the convex glass, so as to make the convex glass display no images; and when the camera is in a turned-off state, the plurality of lamp beads are in a lighting state, and backlight is provided for the convex glass after refraction by the convex glass, so as to make the convex glass display images.

2. The under-display camera structure according to claim 1, wherein the second-type lamp beads are at a maximum brightness value.

3. The under-display camera structure according to claim 1, wherein an inclination angle of the annular conical structure is determined according to a light incident angle of the camera, pixels of the camera, a brightness of the display, a thickness of the display area backlight and a size of the opening area.

4. The under-display camera structure according to claim 1, wherein the flexible printed circuit board is configured to conduct the plurality of lamp beads and is connected to a backlight chip, and the backlight chip is configured to control brightness of the plurality of lamp beads.

5. A method for controlling an under-display camera structure according to claim 1, comprising:
when a camera is detected to be in a turned-on state, turning off predetermined first-type lamp beads close to a camera end and controlling predetermined second-type lamp beads far away from the camera to be in a lighting state, and forming, by light emitted by the second-type lamp beads, a circle of light on a convex glass after being refracted by the convex glass, so as to make the convex glass display no images, wherein a display is arranged above the camera, the display comprises display glass and display area backlight, an opening area is configured in the display area backlight above the camera, the display glass forms convex glass in a direction of the opening area curving towards the camera, a flexible printed circuit board having an annular conical structure is connected between the convex glass and the camera, so as to surround a viewing angle of the camera, a plurality of lamp beads are sequentially arranged on the flexible printed circuit board from the camera end to a convex glass end, and the plurality of lamp beads comprise the first-type lamp beads and the second-type lamp beads; and
when the camera is detected to be in a turned-off state, controlling the plurality of lamp beads to be in a lighting state, and providing backlight for the convex glass after being refracted by the convex glass, so as to make the convex glass display images.

6. The method according to claim 5, wherein before the turning off predetermined first-type lamp beads close to a camera end and controlling predetermined second-type lamp beads away from the camera to be in a lighting state, the method further comprises:
determining an inclination angle of the annular conical structure;
determining a light angle of light emitted by the lamp beads after reflection by the convex glass according to the inclination angle of the annular conical structure, a radian of the convex glass and a light-emitting angle of the lamp beads; and
determining the first-type lamp beads and the second-type lamp beads according to the light angle, the light-emitting angle of the lamp beads and a light incident angle of the camera.

7. The method according to claim 5, wherein after the controlling predetermined second-type lamp beads away from the camera to be in a lighting state, the method further comprises:
adjusting the second-type lamp beads to a maximum brightness value.

8. A non-transitory computer-readable storage medium, storing a computer program, wherein the computer program is configured to run to execute the method as claimed in claim 5.

9. An electronic device, comprising a memory and a processor, wherein the memory stores a computer program, and the processor is configured to run the computer program, so as to execute the method as claimed in claim 5.

10. The method according to claim 5, wherein forming, by light emitted by the second-type lamp beads, a circle of light on the convex glass after being refracted by convex glass comprises:
turning off predetermined first-type lamp beads close to the camera end according to a preset rule, and controlling predetermined second-type lamp beads far away from the camera to be in a lighting state.

11. The method according to claim 5, wherein providing backlight for the convex glass after being refracted by the convex glass comprises:
controlling brightness of the plurality of lamp beads by a backlight chip, wherein the flexible printed circuit board is configured to conduct the plurality of lamp beads and is connected to the backlight chip.

12. The method according to claim 6, wherein the determining the inclination angle of the annular conical structure comprises:
obtaining the light incident angle of the camera, pixels of the camera, a brightness of the display, a thickness of the display area backlight and a size of the opening area; and
determining the inclination angle of the annular conical structure according to the light incident angle of the camera, the pixels of the camera, the brightness of the display, the thickness of the display area backlight and the size of the opening area.

13. A non-transitory computer-readable storage medium, storing a computer program, wherein the computer program is configured to run to execute the method as claimed in claim 6.

14. An electronic device, comprising a memory and a processor, wherein the memory stores a computer program, and the processor is configured to run the computer program, so as to execute the method as claimed in claim 6.

15. The method according to claim 12, wherein after the determining the inclination angle of the annular conical structure, the method further comprises:
determining the number of the plurality of lamp beads and an arrangement mode of the plurality of lamp beads according to the brightness of the display, the inclination angle of the annular conical structure and the size of the opening area.

16. A non-transitory computer-readable storage medium, storing a computer program, wherein the computer program is configured to run to execute the method as claimed in claim 12.

17. An electronic device, comprising a memory and a processor, wherein the memory stores a computer program, and the processor is configured to run the computer program, so as to execute the method as claimed in claim 12.

18. An apparatus for controlling an under-display camera structure according to claim 1, comprising a processor coupled with a memory, and the processor is configured to:
turn off predetermined first-type lamp beads close to a camera end and control predetermined second-type lamp beads away from the camera to be in a lighting state when a camera is detected to be in a turned-on state, light emitted by the second-type lamp bead forms a circle of light on a convex glass after being refracted by the convex glass, so as to make the convex glass display no images, wherein a display is arranged above the camera, the display comprises display glass and display area backlight, an opening area is configured in the display area backlight above the camera, the display glass forms convex glass in a direction of the opening area curving towards the camera, a flexible printed circuit board having an annular conical structure is connected between the convex glass and the camera, so as to surround a viewing angle of the camera, a plurality of lamp beads are sequentially arranged on the flexible printed circuit board from the camera end to a convex glass end, and the plurality of lamp beads comprise the first-type lamp beads and the second-type lamp beads; and control the plurality of lamp beads to be in a lighting state when the camera is detected to be in a turned-off state, backlight being provided for the convex glass after refraction by the convex glass, so as to make the convex glass display images.

19. The under-display camera structure according to claim 1, wherein the display glass is divided into plain glass in a normal display area and the convex glass in a front camera area.

20. The under-display camera structure according to claim 1, wherein a plurality of the lamp beads and the flexible printed circuit board form a camera area backlight, the whole front camera area backlight has an annular conical structure, and is provided with a central opening so as to avoid a viewing angle of the front camera.

* * * * *